United States Patent [19]

Suzuki

[11] Patent Number: 5,672,821

[45] Date of Patent: Sep. 30, 1997

[54] LAMINAR FLOW DEVICE

[75] Inventor: Isao Suzuki, Tokyo, Japan

[73] Assignee: MKS Japan, Inc., Tokyo, Japan

[21] Appl. No.: 571,235

[22] Filed: Dec. 12, 1995

[30] Foreign Application Priority Data

Dec. 12, 1994 [JP] Japan ................... 6-331459
Apr. 3, 1995 [JP] Japan ................... 7-077576

[51] Int. Cl.$^6$ ................................................ G01F 5/00
[52] U.S. Cl. ..................................... 73/202; 138/42
[58] Field of Search .................... 73/861.52, 202, 73/203; 138/40, 42, 43, 44, 45

[56] References Cited

U.S. PATENT DOCUMENTS

| 3,504,542 | 4/1970 | Blevins | 73/861.52 |
| 3,792,609 | 2/1974 | Blair et al. | 73/861.52 |
| 3,851,526 | 12/1974 | Drexel | 73/202 |
| 4,450,718 | 5/1984 | Hartermink | 73/202 |
| 4,497,202 | 2/1985 | Mermelstein | 73/202 |

Primary Examiner—Richard Chilcot
Assistant Examiner—Harshad Patel
Attorney, Agent, or Firm—Wenderoth, Lind & Ponack

[57] ABSTRACT

A laminar flow device includes a plurality of disks and a plurality of spacers alternately stacked together. The plurality of disks are defined by first disks and second disks, each of the first disks having a hole formed through a central portion thereof, and each of the second disks having a plurality of holes formed through an outer peripheral portion thereof. The first disks and the second disks are alternately arranged with the spacer interposed between any two adjacent ones of the disks.

5 Claims, 4 Drawing Sheets

LAMINAR FLOW DEVICE

BACKGROUND OF THE INVENTION

1. Field of the Invention

This invention relates to a laminar flow device used, for example, in a bypass portion of a mass flow sensor.

2. Related Art

A conventional laminar flow device is disclosed in U.S. Pat. No. 3,851,526. In this laminar flow device, fluid flows through very narrow grooves or channels formed in surfaces of disks. Therefore, particles in the fluid are liable to be caught in the grooves, which may cause a measurement error due to pressure loss. In addition, since a plurality of disks are stacked together, the surface areas between the disks except for the flow passage portions are so large that it is difficult to purge the fluid intruded into gaps between the disks therefrom. This results in contamination when the device is used in a semiconductor-manufacturing process. There has been encountered a further problem that it is difficult to clean very narrow grooves when disks are corroded or contaminated.

A laminar flow device, disclosed in U.S. Pat. No. 4,497,202, also has generally the same problems as described above, and besides has a problem that it is difficult-to work or machine disks. Under the circumstances, there has been proposed a laminar flow device as disclosed in U.S. Pat. No. 5,044,199. This laminar flow device is of such a construction that fluid flows along an inner surface of a conduit, and therefore the problems in the above-mentioned laminar flow devices, in which fluid flows in the narrow grooves, are overcome to a certain degree.

However, since this laminar flow device is of such a construction that pressure loss is adjusted by the degree of insertion of a tubular flow splitter into the conduit, the adjustment of pressure loss is difficult. Another problem is that the pressure loss once set or determined can be easily varied by mechanical impact. A further problem is that the construction is complicated, and therefore much time and labor are required to manufacture such a laminar flow device, which increases costs.

SUMMARY OF THE INVENTION

This invention has been made in order to overcome the above problems of the conventional laminar flow devices, and an object of the invention is to provide a laminar flow device which is simple in construction, can be easily manufactured, and allows a pressure drop to be properly adjusted.

Another object is to provide a laminar flow device in which clogging due to particles is less liable to develop in the device, and cleaning of the device can be easily effected.

According to a first aspect of the present invention, there is provided a laminar flow device comprising a plurality of disks and a plurality of spacers alternately stacked together;

the plurality of disks being defined by first disks and second disks, each of the first disks having a hole formed through a central portion thereof, and each of the second disks having a plurality of holes formed through an outer peripheral portion thereof;

the first disks and the second disks being alternately arranged with a spacer interposed between any two adjacent ones of the disks.

According to a second aspect of the invention, there is provided a laminar flow device comprising a plurality of disks and a plurality of spacers alternately stacked together;

the plurality of disks being defined by first disks and second disks, each of the first disks having a hole formed through a central portion thereof, and each of the second disks having a plurality of notches of a generally semicircular shape formed in an outer peripheral edge thereof;

the first disks and the second disks being alternately arranged with a spacer interposed between any two adjacent ones of the disks.

According to a third aspect of the invention, there is provided a laminar flow device comprising a plurality of disks and a plurality of spacers alternately stacked together;

the plurality of disks being defined by one kind of disk each having holes formed through an outer peripheral portion thereof, the holes in each disk being circumferentially spaced from each other;

the plurality of disks being stacked together with a spacer interposed between any two adjacent ones of the disks in such a manner that the holes in each of the disks are disposed out of alignment with the holes in a adjoining disk.

According to a fourth aspect of the invention, there is provided a laminar flow device comprising a plurality of disks and a plurality of spacers alternately stacked together;

the plurality of disks being defined by a first disk, a second disk, and third disks, the first disk having a hole formed through a central portion thereof, the second disk having a plurality of holes formed through an outer peripheral portion thereof, and each of the third disks having a plurality of holes formed through an outer peripheral portion thereof and a hole formed through a central portion thereof;

the first disk and the second disk defining inlet-side and outlet-side end faces of the laminar flow device, respectively; and the third disks and the spacers being alternately arranged between the first and second disks.

The spacer can comprise a thin, narrow ring.

The spacer can comprise a thin member having legs extending radially outwardly from a central portion thereof to assume a star-like configuration, the spacer being so arranged that the legs thereof are disposed out of registry with the peripheral holes or notches formed in the disks.

According to a fifth aspect of the invention, there is provided a laminar flow device comprising a plurality of disks and a plurality of spacers alternately stacked together, each of the disks having a predetermined pattern of holes formed therethrough, and the holes in each of the disks being disposed out of registry with the holes in the disk disposed adjacent thereto.

In the laminar flow device of the first aspect, fluid flows through the central hole in the first disk, and spreads over the surface of the adjoining second disk through a gap formed by the spacer provided therebetween, and then fluid flows through the holes in the outer peripheral portion of this second disk, and spreads over the surface of the adjoining first disk through a gap formed by the spacer provided therebetween. With this fluid passage arrangement, a laminar flow of fluid is formed.

In the laminar flow device of the second aspect, fluid flows through the central hole in the first disk and spreads over the surface of the adjoining second disk through a gap formed by the spacer provided therebetween, and then fluid flows through the notches in the outer peripheral edge of this second disk, and spreads over the surface of the adjoining next first disk through a gap formed by the spacer provided therebetween. With this fluid passage arrangement, a laminar flow of fluid is formed.

In the laminar flow device of the third aspect, fluid flows through the circumferentially-spaced holes in the disk and spreads over the surface of the adjoining disk through a gap formed by the spacer provided therebetween, and then fluid flows through the circumferentially-spaced holes in this disk to spread over the surface of the adjoining disk through a gap formed by the spacer provided therebetween. With this fluid passage arrangement, a laminar flow of fluid is formed.

In the laminar flow device of the fourth aspect, between the first and second disks which define the inlet-side and outlet-side end faces of the laminar flow device, respectively, fluid flows through the holes in the outer peripheral portion of the third disk, and further flows toward the central hole in the adjoining third disk. With this fluid passage arrangement, a laminar flow of fluid is formed.

When the spacer comprises a thin and narrow ring, the fluid spreads over the surface of the adjoining disk through the gap formed by the spacer, and therefore the surface of the disk can be effectively used as a fluid passage.

When the spacer includes legs arranged to assume a star-like configuration, a gap is formed by the spacer between the adjacent disks, and the holes in the adjacent disks are communicated with each other through this gap, and fluid flows to spread over the disk through the gap. Thus, the surface of the disk can be effectively used as a fluid passage.

In the laminar flow device of the fifth aspect, fluid emerging from the holes in the disk does not flow directly into the holes in the adjoining disk, but spreads over the surface of this adjoining disk, and subsequently is directed toward the holes in this adjoining disk.

DETAILED DESCRIPTION OF THE PREFERRED EMBODIMENTS

Figure 1:
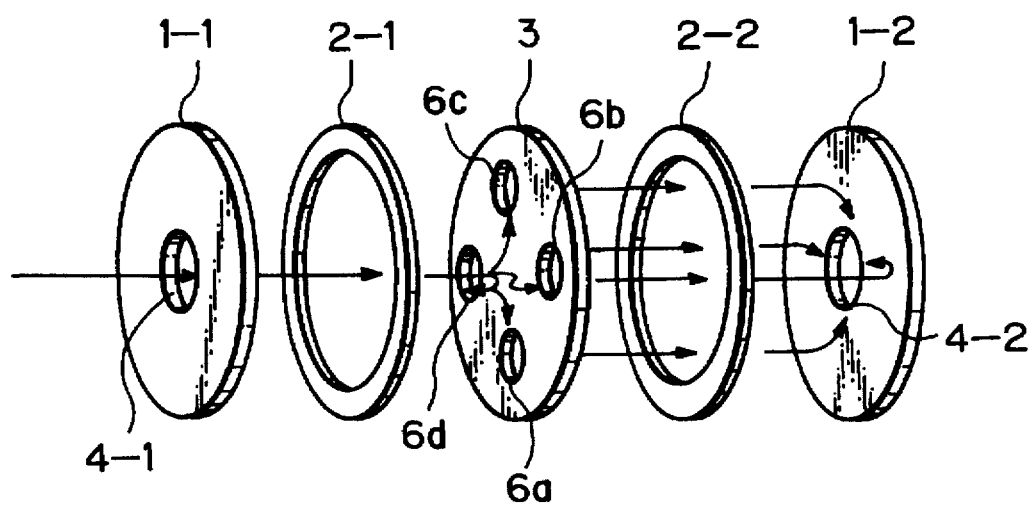
FIG. 1 is an exploded, perspective view of a first embodiment of a laminar flow device of the present invention.

A preferred embodiment of a laminar flow device of the present invention will now be described with reference to the accompanying drawings. Identical reference numerals denote corresponding parts, respectively, throughout the drawings, and repeated explanation of such identical portions will be omitted.

FIG. 1 is an exploded, perspective view of the laminar flow device of one embodiment of the invention. This laminar flow device comprises disks 1—1, 1-2, a disk 3 of a different kind, and spacers 2-1 and 2—2 each interposed between respective adjacent ones of the disks. The two disks 1—1 and 1—2, the disk 3 and the two spacers 2-1 and 2—2 (see FIG. 1) each interposed between the adjacent disks constitute one basic unit. Holes 4-1 and 4-2 of a relatively large diameter are formed through respective central portions of each of the disks 1—1 and 1-2, and four holes 6a to 6d smaller in diameter than holes 4-1 and 4-2 are formed through an outer peripheral portion of the disk 3, and are circumferentially spaced from one another at predetermined intervals. Each spacer 2-1 and 2—2 is defined by a thin, narrow ring having a thickness of 0.05 mm to 0.3 mm.

Figure 2:
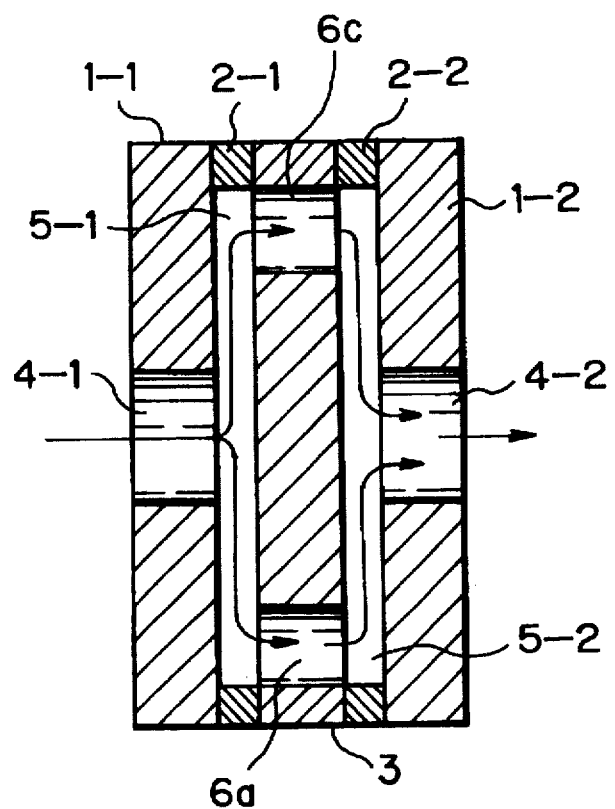
FIG. 2 is a cross-sectional view of the laminar flow device of FIG. 1.

FIG. 2 is a cross-sectional view showing the positional relationship of the holes 4-1, 4-2 and 6a to 6d when the disks 1—1 and 1-2, the disk 3 and the spacers 2-1 and 2—2 are stacked together. Arrows in FIGS. 1 and 2 indicate flow of fluid. More specifically, fluid flows through the central hole 4-1 in the disk 1—1 to reach the front surface of the disk 3, and then reaches the holes 6a to 6d in the disk 3 through a gap formed by the spacer 2-1. Subsequently, fluid, passed through the holes 6a to 6d, flows generally convergently into the central hole 4-2 in the disk 1-2 through a gap formed by the spacer 2—2. This is one unit, and this flow is repeated for each of a necessary number of units.

Generally, when fluid flows through a laminar flow device, a pressure differential between opposite ends of the flow control device is proportional to volume flow of fluid if the fluid forms a laminar flow. It is known that the flow is maintained as a laminar flow when the Reynold's number is not more than 2,000, and usually, narrow tubes are bundled together to form a laminar flow device. In contrast, in this embodiment of the invention, fluid is caused to flow through the gaps (each having a thickness of 0.05 mm to 0.3 mm) formed by the spacers 2-1 and 2—2, and this construction performs the function achieved by a bundle of narrow tubes.

In this embodiment, the thickness of the spacers 2-1 and 2—2 of the laminar flow device is varied depending on the rate of flow of fluid. More specifically, when the flow rate is low, spacers of a small thickness are used, and when the flow rate is high, spacer of a large thickness are used, or the spacers of a smaller thickness are stacked together so as to increase the gap. If the gap formed by the spacer is large, this deals with a high flow rate, but a turbulence is liable to occur. Therefore, when the gap formed by the spacer is large, an increased number of the units (each shown in FIG. 1) are stacked together, thereby increasing the length of the fluid flow passage, thus enabling the fluid of a high flow rate to be formed into laminar flow.

Figure 3:
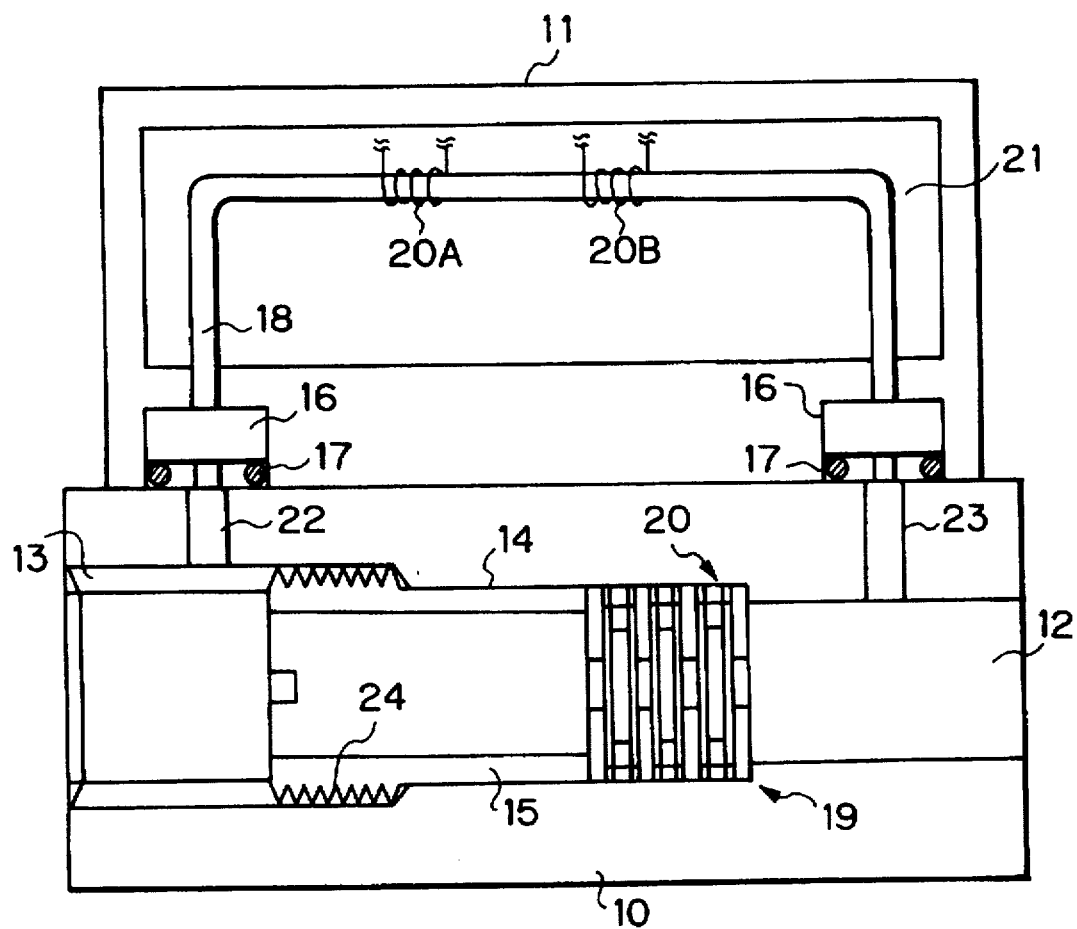
FIG. 3 is a view showing the construction of a mass flow sensor incorporating the laminar flow device of FIG. 1.

FIG. 3 shows the construction of a mass flow sensor incorporating the above laminar flow device. The mass flow sensor comprises a housing 11 fixedly mounted on a base 10, the housing 11 having a sensor chamber. A bypass hole 12 is formed in the base 10, and a threaded portion 13 is formed on an inner surface of a larger-diameter inlet portion of the bypass hole 12. A bore or diameter of a central portion 14 of the bypass hole 12 is equal to the outer diameter of the disks, and a shoulder or stepped portion 19 is formed between the central portion 14 and an outlet portion of a smaller diameter. The laminar flow device 20, comprising several units (each shown in FIGS. 1 and 2), is set in the central portion 14, and the laminar flow device 20 is moved through a threaded portion 24 on a fixing nut 15, and is fixedly held between the fixing nut 15 and the shoulder 19. A communication hole 22 extends from the inlet portion of the bypass hole 12 toward the housing 11, and a communication hole 23 extends from the outlet portion of the bypass hole 12 toward the housing 11.

The communication holes 22 and 23 lead respectively to mounting holes formed in the housing 11 in which respective flanges 16 are mounted. An O-ring 17 is provided between each flange 16 and the base 10 to form a seal therebetween. A sensor tube 18 extends through the flanges 16, and are fixedly secured thereto, and this sensor tube 18 is disposed in a sensor chamber 21. A pair of heating resistors 20A and 20B are wound on a central portion of the sensor tube 18 disposed in the sensor chamber 21, and cooperate with resistors (not shown) to form a bridge circuit, and the mass flow is detected in accordance with balance and imbalance of a bridge circuit.

As described above, the laminar flow device 20 of this embodiment can be easily assembled by sequentially putting its component parts (that is, the disk 1—1, the spacer 2-1, the disk 3, the spacer 2—2 and the disk 1-2) into the bypass hole 12, and then by fixing these component parts together by the fixing nut 15.

Figure 4:
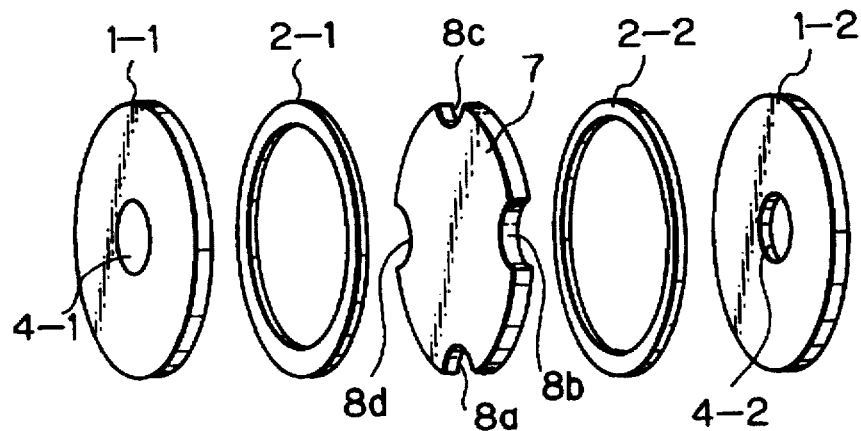
FIG. 4 is an exploded, perspective view of a second embodiment of a laminar flow device of the invention.

FIG. 4 is an exploded, perspective view of a second embodiment of a laminar flow device of the invention. In this embodiment, instead of the disk 3 of the embodiment of FIG. 1, a disk 7 is used. Four notches 8a to 8d of a generally semicircular shape are formed in a peripheral edge of the disk 7, and are circumferentially spaced from one another at equal intervals. In this embodiment, fluid flows through a central hole 4-1 in a disk 1—1 to reach a front surface of the disk 7, and then reaches the notches 8a to 8d in the peripheral edge of the disk 7 through a gap formed by a spacer 2-1. Subsequently, fluid passed through the notches 8a to 8d flows generally convergently into a central hole 4-2 in a disk 1-2 through a gap formed by a spacer 2—2. This forms one unit of fluid flow, and this flow is repeated for each of a necessary number of units.

Figure 5:
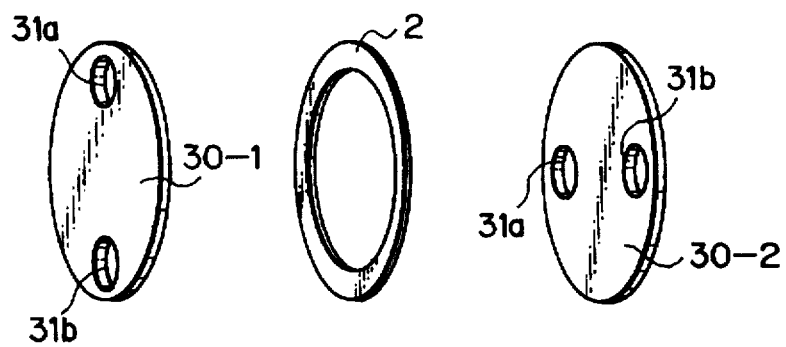
FIG. 5 is an exploded, perspective view of a third embodiment of a laminar flow device of the invention.

FIG. 5 is an exploded, perspective view of a third embodiment of a laminar flow device of the invention. In this embodiment, a spacer 2 is interposed between disks 30-1 and 30-2. A pair of diametrically-opposite holes 31a and 31b are formed through an outer peripheral portion of each of the disks 30-1 and 30-2, and are disposed on a common diametrical line. The disks 30-1 and 30-2 are angularly displaced at an angle of 90° with respect to each other, and the spacer 2 is interposed between the two disks. This procedure is repeated to form the laminar flow device. In this embodiment, also, fluid flows over the surfaces of the disks 30, and laminar flow is formed.

Figure 6:
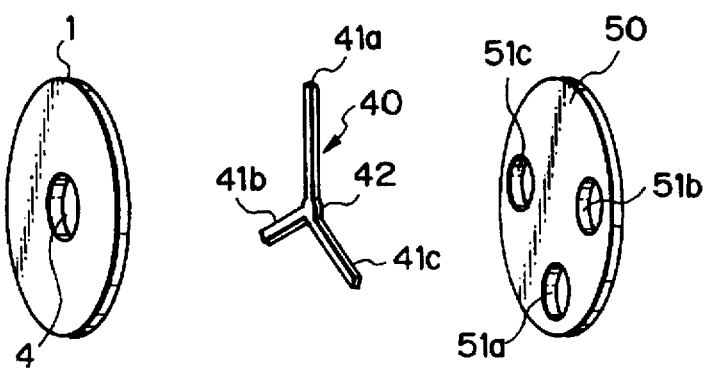
FIG. 6 is an exploded, perspective view of a fourth embodiment of a laminar flow device of the invention.

FIG. 6 is an exploded, perspective view of a fourth embodiment of a laminar flow device of the invention. In this embodiment, a disk 50 is used instead of the disk 3 of FIG. 1, and a spacer 40 is used instead of the spacer 2-1. Three holes 51a, 51b and 51c are formed through an outer peripheral portion of the disk 50, and are circumferentially spaced from one another at equal intervals. The spacer 40 includes a core portion 42, and three legs 41a to 41c extending radially outwardly from the core portion 42, the legs 41a to 41c being spaced 120° from one another, thus assuming a star-like configuration. The length from the center of the core portion 42 to a distal end of each leg 41a to 41c is equal to the radius of the disks 1 and 50. The core portion 42 has such a diameter as not to close a hole 4 in the disk 1. The spacer 40 is stacked on the disk 50 in such a manner that the legs 41a to 41c do not overlap the holes 51a to 51c. This procedure is repeated to form the laminar flow device. In this embodiment, also, fluid flows over the surfaces of the disks because of the provision of the gaps formed by the spacer, so that a laminar flow is formed.

Figure 7:
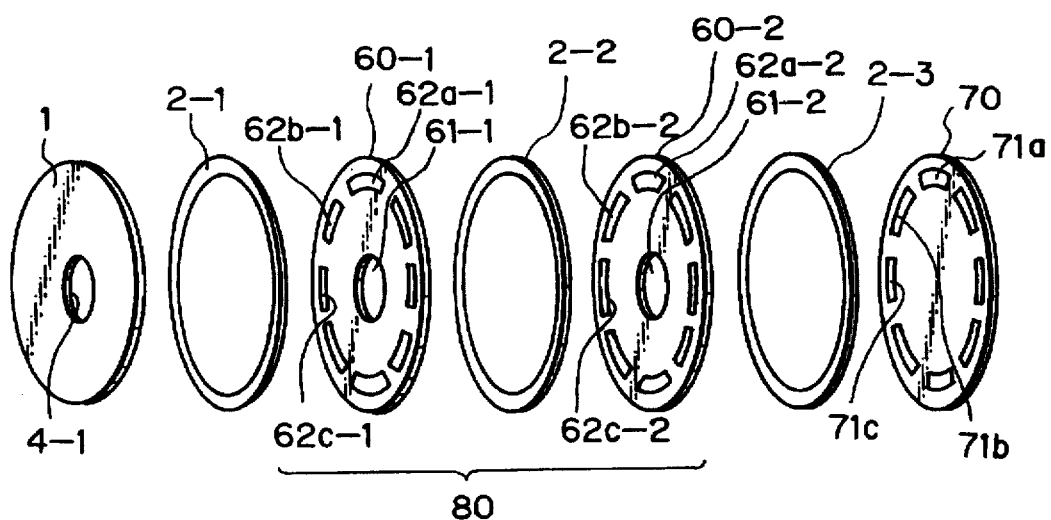
FIG. 7 is an exploded, perspective view of a fifth embodiment of a laminar flow device of the invention.

FIG. 7 is an exploded, perspective view of a fifth embodiment of a laminar flow device of the invention. The laminar flow device of this embodiment includes a first disk 1 having a hole 4-1 formed through a central portion thereof, a second disk 70 having a plurality of holes 71a, 71b, 71c ... formed through an outer peripheral portion thereof, and third disks 60-1 and 60-2 each having a plurality of holes 62a-1, 62b-1, 62c-1 ... or 62a-2, 62b-2, 62c-2 formed through an outer peripheral portion thereof, and also having a hole 61-1 or 61-2 formed through a central portion thereof. The disks 1 and 70 define opposite (inlet-side and outlet-side) end faces of the laminar flow device, respectively, and the third disks 60-1 and 60-2 are provided between the disks 1 and 70, with a spacer 2-1, 2—2, 2-3 interposed between any two adjacent ones of these disks. By stacking a necessary number of sets 80 (see FIG. 7) each consisting of the third disks 60-1 and 60-2 and the spacer 2—2, a laminar flow device having a desired thickness can be obtained. The diameter of the hole 4-1 in the disk 1 is equal to or slightly smaller than the diameter of the holes 61-1 and 61-2 in the disks 60-1 and 60-2. The plurality of holes 62a-1, 62b-1 ... and 62a-2, 62b-2 in the disks 60-1 and 60-2, as well as the plurality of holes 71a, 71b, 71c ... in the disk 70, have an arcuate shape, and are disposed radially inwardly of the inner periphery of the ring-shaped spacers 2-1, 2—2, 2-3.

Figure 8:
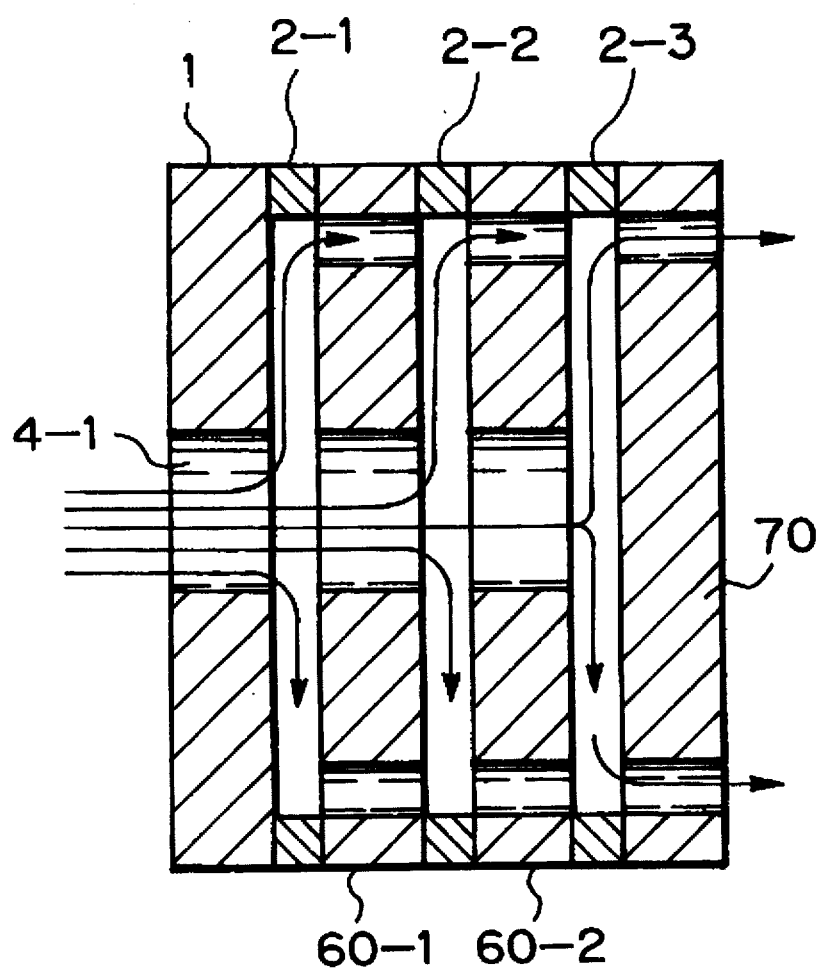
FIG. 8 is a cross-sectional view of the laminar flow device of FIG. 7.

FIG. 8 is a cross-sectional view of the laminar flow device formed by stacking the disk 1, the disks 60-1 and 60-2, the disk 70 and the spacers 2-1 to 2-3 together. Fluid flows as indicated by arrows in FIG. 8. More specifically, fluid flows straight through the central hole 4-1 in the disk 1, and impinges on a front surface of the disk 70, and further flows out of the holes 71a, 71b, 71c ... through a gap formed by the spacer 2-3. Also, as a result of impingement of the fluid on the surface of the disk 70, fluid flows through the plurality of holes 61a-2, 61b-2, 61c-2 ... , formed in the outer peripheral portion of the disk 60-2, via a gap formed by the spacer 2—2, and similarly fluid flows through the plurality of holes 61a-1, 61b-1, 61c-1 ... , formed in the outer peripheral portion of the disk 60-1, via a gap formed by the spacer 2-1, thereby achieving laminar flow.

In this embodiment, the thickness of the spacers 2-1 to 2-3 is not more than 0.1 mm. With this arrangement, the distance from the central hole 4-1 in the disk 1 to the plurality of holes 61a-1, 61b-1, 61c-1 ... in the outer peripheral portion of the disk 60-1, the distance from the central hole 4-1 to the plurality of holes 61a-2, 61b-2, 61c-2 ... in the outer peripheral portion of the disk 60-2, and the distance from the central hole 4-1 to the holes 71a, 71b, 71c ... in the disk 70 can be made sufficiently long relative to the spacing or gap between the spacers 2-1 to 2-3 to achieve a good laminar flow.

In the laminar flow device of this embodiment, the conductance of the plurality of holes 61a-1, 61b-1, 61c-1 in the outer peripheral portion of the disk 60-1, the conductance of the plurality of holes 61a-2, 61b-2, 61c-2 in the outer peripheral portion of the disk 60-2, and the conductance of the holes 71a, 71b, 71c ... in the disk 70, as well as the conductance of the central holes 4-1, 61-1 and 61-2, are sufficiently larger than the conductance between the disks 1, 60-1, 60-2 and 70. Therefore, total pressure loss in the laminar flow device is equal to pressure loss developing between each adjacent pair of disks. Therefore, by increasing the number of sets 80 (see FIG. 7) consisting of the disks 60-1 and 60-2 and the spacer the overall flow rate in the laminar flow device can be increased.

In the above embodiments, the number and arrangement of the holes in the disks can be suitably varied at need. However, even if the disks 1 are stacked together, fluid merely flows straight through the holes 4-1, and therefore laminar flow cannot be achieved. In short, it is only necessary to provide such a construction that the flowing fluid can impinge on the subsequent disk in the gap portion formed by the spacer. Namely, in the laminar flow devices of the present invention, the plurality of perforated disks are stacked together with spacers therebetween in such a manner that the holes in the adjacent disks are disposed out of registry with each other. The plurality of disks are stacked together coaxially with one another.

As described above, in the present invention, since the laminar flow device is constituted by the disks and the spacers, the number of the component parts is small, and the construction is simple, and the laminar flow device can be easily provided. And besides, in the laminar flow devices of the invention, fluid is caused to flow over the surface of the subsequent disk because of the provision of the gap formed by the spacer, and therefore the entire surfaces of the disks are utilized, thus reducing dead spaces. The pressure loss can be easily determined by suitably selecting the thickness of the spacers, and the required linearity can be achieved by adjusting the number of the disks and the number of the spacers. In the laminar flow devices of the invention, no narrow grooves are formed in the surface of the disks, and therefore clogging or plugging by particles can be avoided, and cleaning of the laminar flow device can be effected easily.

What is claimed is:

1. A laminar flow device comprising:

a plurality of disks and a plurality of spacers alternately stacked together;

said plurality of disks being defined by first disks and second disks, each of said first disks having a hole formed through a central portion thereof, and each of said second disks having a plurality of holes formed through an outer peripheral portion thereof;

said first disks and said second disks being alternately arranged with a respective said spacer being interposed between any two adjacent ones of said disks;

each said spacer comprising a thin, narrow ring having an outer diameter the same as an outer diameter of said disks; and all said holes in said first disks and in said second disks being located inwardly of an inner periphery of each said ring.

2. A laminar flow device comprising:

a plurality of disks and a plurality of spacers alternately stacked together;

said plurality of disks being defined by first disks and second disks, each of said first disks having a hole formed through a central portion thereof, and each of said second disks having a plurality of notches of a generally semicircular shape formed in an outer peripheral edge thereof;

said first disks and said second disks being alternately arranged with a respective said spacer being interposed between any two adjacent ones of said disks;

each said spacer comprising a thin, narrow ring having an outer diameter the same as an outer diameter of said disks; and all said holes in said first disks and said notches in said second disks being located inwardly of an inner periphery of each said ring.

3. A laminar flow device comprising:

a plurality of disks and a plurality of spacers alternately stacked together;

said plurality of disks being defined by one kind of disk each having holes formed through an outer peripheral portion thereof, said holes in each said disk being circumferentially spaced from each other;

said plurality of disks being stacked together with a respective said spacer being interposed between any two adjacent ones of said disks in such a manner that said holes in each of said disks are disposed out of alignment with said holes in an adjoining said disk;

each said spacer comprising a thin, narrow ring having an outer diameter the same as an outer diameter of said disks; and all said holes in said disks being located inwardly of an inner periphery of each said ring.

4. A laminar flow device comprising:

a plurality of disks and a plurality of spacers alternately stacked together;

said plurality of disks being defined by a first disk, a second disk, and third disks, said first disk having a hole formed through a central portion thereof, said second disk having a plurality of holes formed through an outer peripheral portion thereof, and each of said third disks having a plurality of holes formed through an outer peripheral portion thereof and a hole formed through a central portion thereof;

said first disk and said second disk defining inlet-side and outlet-side end faces of said laminar flow device, respectively;

said third disks and said spacers being alternately arranged between said first and second disks;

each said spacer comprising a thin, narrow ring having an outer diameter the same as an outer diameter of said disks; and all said holes in said first disk, said second disk and said third disks being located inwardly of an inner periphery of each said ring.

5. A laminar flow device comprising:

a plurality of disks and a plurality of spacers alternately stacked together;

each of said disks having a predetermined pattern of holes formed therethrough;

said holes in each of said disks being disposed out of registry with said holes in a said disk disposed adjacent thereto;

each said spacer comprising a thin, narrow ring having an outer diameter the same as an outer diameter of said disks; and all said holes in said disks being located inwardly of an inner periphery of each said ring.

* * * * *